United States Patent
Kim et al.

(10) Patent No.: US 11,280,502 B2
(45) Date of Patent: Mar. 22, 2022

(54) AIR-COOLED HEAT EXCHANGER

(71) Applicant: DTS Inc., Gunsan-si (KR)

(72) Inventors: Sung Yong Kim, Seoul (KR); Min Ho Jung, Gunsan-si (KR); Ok Ki Kim, Gimje-si (KR)

(73) Assignee: DTS Inc., Gunsan-si (KR)

( * ) Notice: Subject to any disclaimer, the term of this patent is extended or adjusted under 35 U.S.C. 154(b) by 0 days.

(21) Appl. No.: 17/030,431

(22) Filed: Sep. 24, 2020

(65) Prior Publication Data

US 2021/0088233 A1      Mar. 25, 2021

(30) Foreign Application Priority Data

Sep. 24, 2019   (KR) ........................ 10-2019-0117236

(51) Int. Cl.
*F24F 1/16*      (2011.01)
*F24F 1/38*      (2011.01)

(52) U.S. Cl.
CPC . *F24F 1/16* (2013.01); *F24F 1/38* (2013.01)

(58) Field of Classification Search
CPC ........ F28D 1/047; F28B 1/06; F04D 29/5826; F04D 29/664; F04D 29/329;
(Continued)

(56) References Cited

U.S. PATENT DOCUMENTS 3,854,459 A * 12/1974 Stimeling ................ F01P 11/10
                                                                  165/98
4,235,571 A * 11/1980 Larinoff .................. F04D 29/34
                                                                  417/1

(Continued)

FOREIGN PATENT DOCUMENTS

JP         2008-241187 A      10/2008
JP         2008241187 A  *   10/2008
(Continued)

OTHER PUBLICATIONS

JP-2008241187-A English Translation (Year: 2008).*
Korean office action dated Sep. 16, 2020 from Korean Industrial Property Office for Korean Application No. 10-2019-0117236.

*Primary Examiner* — Schyler S Sanks
(74) *Attorney, Agent, or Firm* — Insight Law Group, PLLC; Seung Lee

(57) ABSTRACT

An air-cooled heat exchanger is provided. A reinforcement beam is laterally attached to an upper surface of a guide housing which is formed to have a dome shape having an area gradually increasing in a downward direction from the stack to guide air discharged to the stack. In another aspect, an air-cooled heat exchanger may further include an enclosure surrounding a power transmission part configured to transmit a rotation force of a motor to the fan to rotate the fan. In still another aspect, a power transmission part may include a drive pulley coupled to a rotation shaft of a motor part, a driven pulley coupled to a drive shaft of a fan, and a belt installed between the drive pulley and the driven pulley to transmit a rotation force of a motor, and an enclosure may include a drive pulley enclosure part of which an outer surface is fixed to the motor part and which surrounds the drive pulley, a driven pulley enclosure part which includes a lid coupled to a lower surface of the driven pulley enclosure part and openable and closeable downward and surrounds the driven pulley, and a belt enclosure part surrounding the belt.

3 Claims, 5 Drawing Sheets

(58) Field of Classification Search
CPC . F04D 19/002; F24F 1/50; F24F 11/89; F24F 1/16; F24F 1/38
See application file for complete search history.

(56) References Cited

U.S. PATENT DOCUMENTS

2006/0292425 A1* 12/2006 Suh ................... H01M 8/04089
　　　　　　　　　　　　　　　　　　　　　　　　429/410
2016/0363388 A1* 12/2016 Egolf ................... F28D 1/0477

FOREIGN PATENT DOCUMENTS

| JP | 2015-135233 A | 7/2015 |
| KR | 10-2006-0097932 A | 9/2006 |

* cited by examiner

AIR-COOLED HEAT EXCHANGER

CROSS-REFERENCE TO RELATED APPLICATION(S)

This application claims priority from Korean Patent Application No. 10-2019-00117236, filed on Sep. 24, 2019, in the Korean Intellectual Property Office, the disclosure of which is incorporated herein by reference in its entirety.

BACKGROUND

1. Field

The following description relates to an air conditioning technology, and more specifically, to an air-cooled heat exchanger.

2. Description of Related Art

In an air-cooled heat exchanger, a cooling target fluid such as cooling water, which is used in an indoor air conditioner for cooling and has an increased temperature, flows along a heat exchange pipe. When external air, which is introduced by a fan being driven, comes into contact with a heat exchange pipe, the cooling water is cooled due to a heat exchange effect.

When the air-cooled heat exchanger is driven, a fan drive part, a power transmission part, a fan drive shaft, the fan, and the like are rotated, and a dome shape guide housing configured to guide air vibrates so that noises in various frequency bands are generated.

When the air-cooled heat exchanger is manufactured, a noiseproof design is achieved on the basis of noise control standards. For example, noise measurement points (for example, 13 points) according to standard noise regulations are positioned around the air-cooled heat exchanger to have a hemisphere shape at uniform intervals. Sensors are disposed at the measurement points to measure noise. Levels of the noise measured at the measurement points should be less than a sound power level specified in the standard noise regulations for each frequency band.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to realizing low noise in an air-cooled heat exchange within regulations.

In addition, the following description relates to realizing low noise in an air-cooled heat exchanger within regulations without incurring a high cost.

In addition, the following description relates to realizing a low noise structure in an air-cooled heat exchanger which facilitates maintenance.

In one general aspect, in an air-cooled heat exchanger, a reinforcement beam is laterally attached to an upper surface of a guide housing which is formed to have a dome shape having an area gradually increasing in a downward direction from the stack to guide air discharged to the stack.

In another aspect, a stack in which a fan is installed may have a height extending from a top of the fan by at least a height of the fan.

In still another aspect, an air-cooled heat exchanger may further include an enclosure surrounding a power transmission part configured to transmit a rotation force of a motor to the fan to rotate the fan.

In yet another aspect, an enclosure may include a lid disposed on a lower surface of the enclosure and openable and closeable downward.

In yet another aspect, an aluminum foam sound absorbent may be formed on an inner surface of an enclosure.

Other features and aspects will be apparent from the following detailed description, the accompanying drawings, and the claims.

Figure 1:
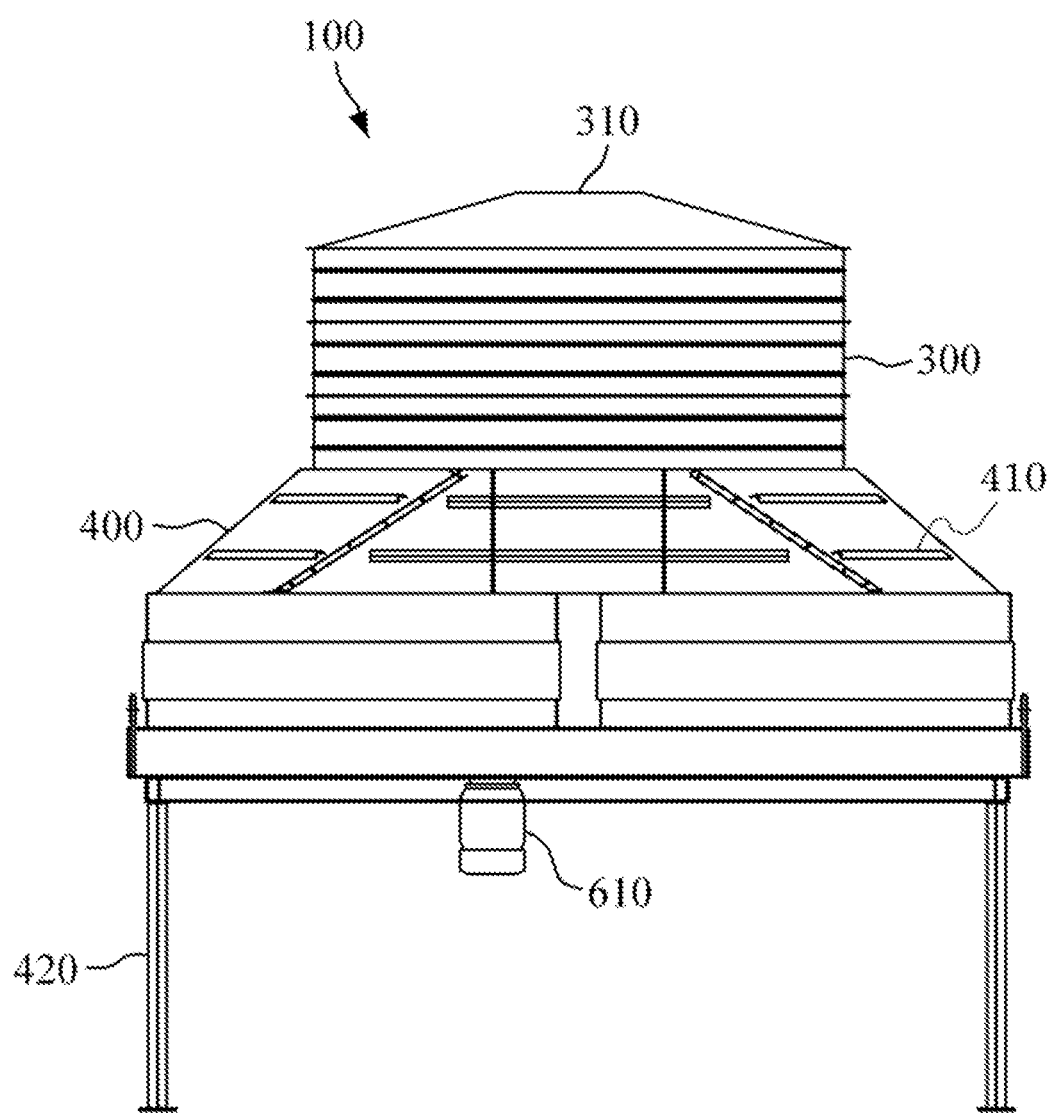
FIG. 1 is a front view illustrating an air-cooled heat exchanger according to one embodiment.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects of the present invention will be realized using embodiments described with reference to the accompanying drawings. It is understood that components in the embodiments may be variously combined in one embodiment as long as there are no mentions thereabout and confliction therebetween.

Figure 2:
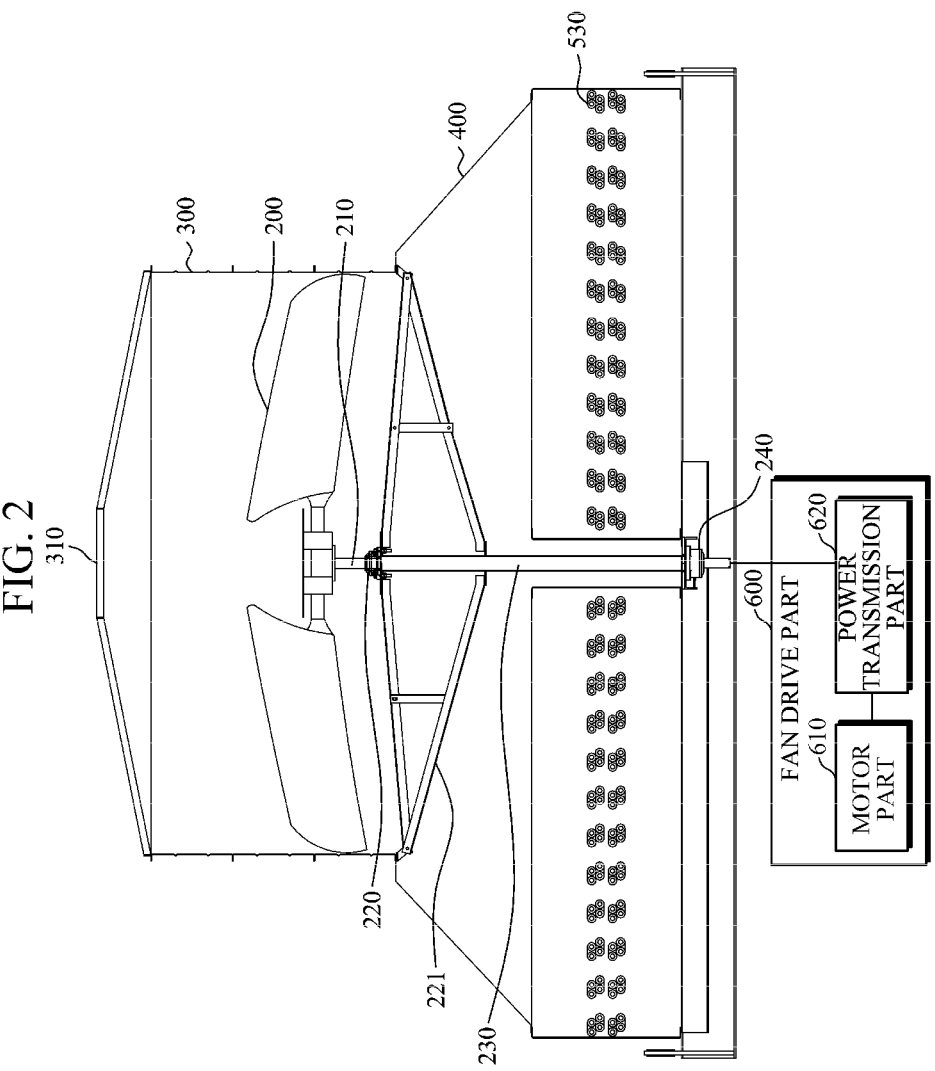
FIG. 2 is a cross-sectional view illustrating the air-cooled heat exchanger according to one embodiment.
Figure 3:
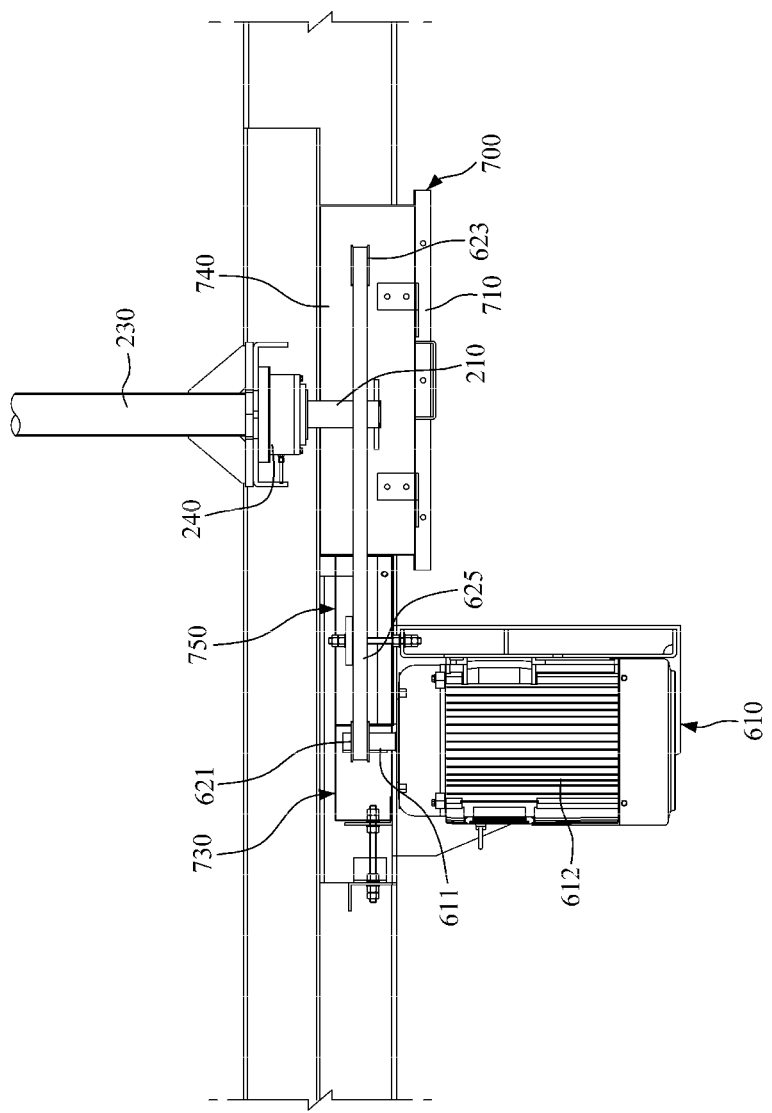
FIG. 3 is a cross-sectional view illustrating a fan drive part according to one embodiment.
Figure 4:
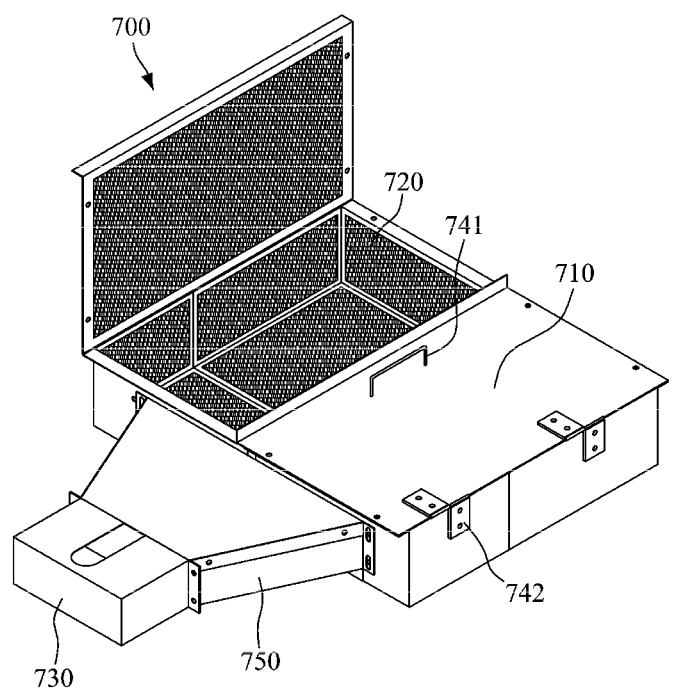
FIG. 4 is a perspective view illustrating an enclosure according to one embodiment.
Figure 5:
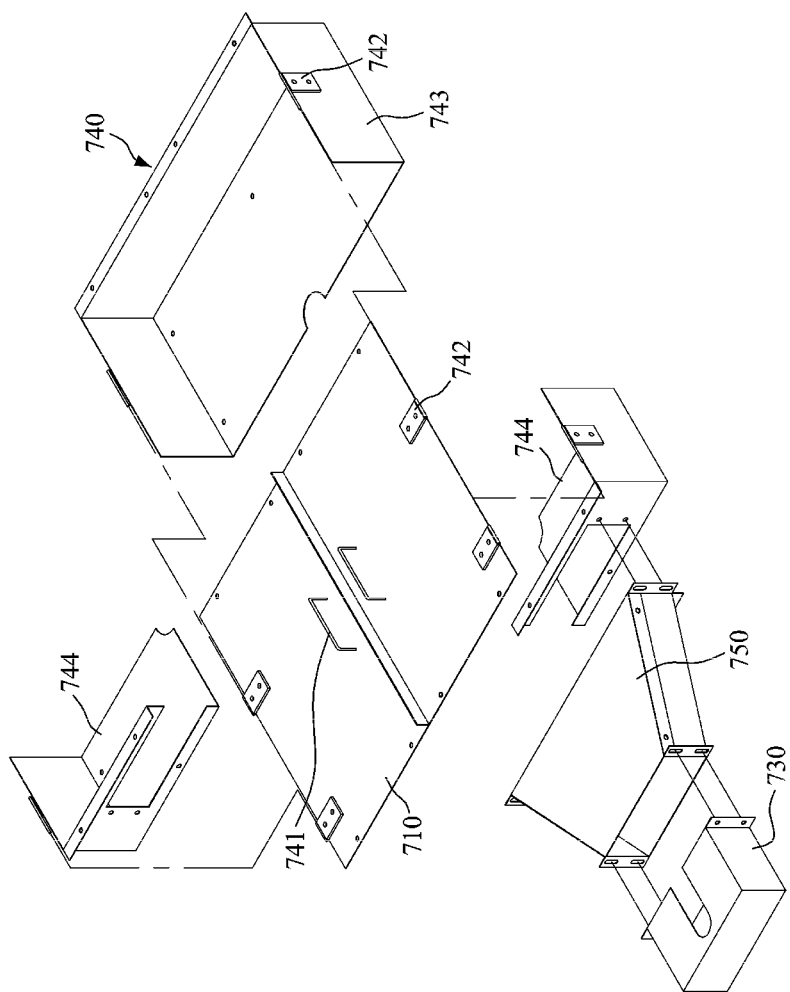
FIG. 5 is an exploded perspective view illustrating the enclosure according to one embodiment.

FIG. 1 is a front view illustrating an air-cooled heat exchanger according to one embodiment, FIG. 2 is a cross-sectional view illustrating the air-cooled heat exchanger according to one embodiment, FIG. 3 is a cross-sectional view illustrating a fan drive part according to one embodiment, FIG. 4 is a perspective view illustrating an enclosure according to one embodiment, and FIG. 5 is an exploded perspective view illustrating the enclosure according to one embodiment.

An air-cooled heat exchanger 100 incudes a fan 200, a stack 300, a guide housing 400, and a heat exchange pipe part 500, and a fan drive part 600.

The fan 200 is installed in the stack 300, and the stack 300 has a vertical height extending from a top of the fan 200 by at least a height of the fan 200. In one embodiment, the stack has the vertical height extending from the top of the fan 200 by the height of the fan 200. Accordingly, the stack 300 has advantages in that noise generated through an exhaust 310, particularly, low frequency noise, is focused on a noise measurement point positioned perpendicularly above the stack 300 and is not distributed around the stack 300 and noise levels of other noise measurement points are also relatively reduced. Accordingly, noise reduction in compliance with regulations is realized using a simple structure.

The guide housing 400 is formed to have a dome shape having an area gradually increasing in a downward direction from the stack 300 to guide air discharged to the stack 300.

According to one embodiment, as illustrated in FIG. 1, a surface of the dome shape of the guide housing may be a polygonal surface. The guide housing is generally manufactured by performing plate work on a steel sheet. Air is discharged upward through the dome shape guide housing due to rotation of the fan to vibrate the guide housing, and thus noise is generated. A reinforcement beam 410 is laterally attached to and installed on an upper surface of the guide housing in FIG. 1, and the reinforcement beam 410 may be attached to an outer wall of the upper surface thereof but may also be attached to an inner wall of the upper surface in some cases. Since the reinforcement beam 410 is attached to the upper surface of the guide housing 400, noise due to vibration of the guide housing 400 is reduced.

The heat exchange pipe part is disposed in the guide housing 400. The heat exchange pipe part includes an inlet through which a cooling target fluid such as cooling water of an air conditioner is introduced, an outlet through which the cooled cooling target fluid is output toward the air conditioner, and a heat exchange pipe 530 (see FIG. 2) through which the cooling target fluid flows. Generally, the heat exchange pipe in the air-cooled heat exchanger extends in a zigzag manner from the inlet to the outlet to increase a heat exchange surface, and the cooling target fluid flows through an inner portions of the heat exchange pipe. The cooling target fluid comes into contact with air to exchange heat with the air so that the cooling target fluid is cooled.

According to the embodiment, as illustrated in FIG. 2, the heat exchange pipe 530 may be laterally disposed in a lower space of the guide housing 400 into which external air is introduced. According to the embodiment, the heat exchange pipe 530 may be disposed throughout the lower space to maximize an area for exchanging heat. The inlet and the outlet are not illustrated in the drawings. Since an arrangement structure of the heat exchange pipe in the air-cooled heat exchanger and an implemented technology of the inlet and the outlet are known in the art, more detailed descriptions thereof will be omitted.

The fan drive part 600 includes a motor part 610 and a power transmission part 620 configured to transmit a rotation force of the motor part 610 to the fan 200 to rotate the fan 200. When the motor part 610 rotates, the power transmission part 620 transmits the rotation force of the motor part 610 to the fan 200. Accordingly, the fan 200 is rotated, and the external air is introduced through the lower space of the guide housing 400. The introduced external air passes through the heat exchange pipe 530 to cool the cooling target fluid flowing in the heat exchange pipe 530. Then, the external air is discharged through the exhaust 310 of the stack 300.

According to an additional aspect of the present invention, an air-cooled heat exchanger 100 further includes an enclosure 700 surrounding a power transmission part 620. Accordingly, noise generated due to the power transmission part 620 can be reduced. Unlike a guide housing, the noise of the power transmission part 620 is noise generated due to rotation of a belt and includes many high frequency components. According to one embodiment, an enclosure for noise reduction is not included in the motor part 610. In the case of the motor part 610, maintenance of the enclosure is inconvenient when compared to an effect of noise reduction thereof.

According to another aspect of the present invention, the enclosure 700 includes a lid 710 (see FIG. 4) disposed on a lower surface thereof and openable and closeable downward. Accordingly, a manager can conveniently open the lid 710 from under the enclosure 700 to maintain the power transmission part 620. For example, maintenance work for replacing consumables such as a belt in the power transmission part 620 can be conveniently performed.

According to still another aspect of the present invention, a sound absorbent 720 (see FIG. 4) formed of aluminum foam may be formed on an inner surface of the enclosure 700. Accordingly, noise generated due to the power transmission part 620 is further reduced. As is well known, since the aluminum foam is a metal formed by foaming aluminum by ten times or more to be a sponge type and have properties of a porous material, the aluminum foam has a high soundproof (sound adsorption) effect due to its high absorption force. Particularly, the aluminum foam is advantageous for absorbing high frequency noise.

According to yet another aspect of the present invention, the power transmission part 620 may include a drive pulley 621, a driven pulley 623, and a belt 625 (see FIG. 3). The drive pulley 621 is coupled to a rotation shaft 611 of a motor part 610 and the driven pulley 623 is coupled to a fan drive shaft 210 of a fan 200. The belt 625 is installed between the drive pulley 621 and the driven pulley 623 to transmit a rotation force of a motor 612.

According to yet another aspect of the present invention, the enclosure 700 may include a drive pulley enclosure part 730, a driven pulley enclosure part 740, and a belt enclosure part 750 (see FIG. 3).

The drive pulley enclosure part 730 surrounds the drive pulley 621. Accordingly, noise generated from the drive pulley 621 can be reduced. An outer surface of the drive pulley enclosure part 730 is fixed to the motor part 610. As illustrated in FIG. 3, according to one embodiment, a lower surface of the drive pulley enclosure part 730 may be fixed to an upper surface of a housing of the motor part 610.

The driven pulley enclosure part 740 includes the lid 710, which is disposed on a lower surface thereof and which is openable and closeable, and surrounds the driven pulley 623 (see FIG. 4). Accordingly, noise generated from the driven pulley 623 can be reduced. In addition, the lid 710 is positioned at a lower portion of the driven pulley enclosure part 740 so as to be convenient for a manager, and the manager can open the lid 710 to conveniently replace the belt 625.

The belt enclosure part 750 surrounds the belt 625. Accordingly, noise generated from the belt 625 can be reduced. According to one embodiment, the belt enclosure part 750 may have a shape which is a shape of the belt which is installed on a pulley, for example, an isosceles trapezoid shape.

According to yet another aspect of the present invention, an aluminum foam sound absorbent 720 may be formed on an inner surface of at least one of the drive pulley enclosure part 730, the driven pulley enclosure part 740, and the belt enclosure part 750 (see FIG. 4). Accordingly, noise generated from at least one of the drive pulley 621, the driven pulley 623, and the belt 625 is absorbed by the sound absorbent 720 so that a soundproof effect is further improved.

According to one embodiment, the lower surface of the driven pulley enclosure part 740 may be formed as the lid 710 which is a two-door type including handles 741. Hinges 742 are provided at both end portions of the two-door type lid 710. According to one embodiment, a portion of the driven pulley enclosure part 740 excluding the lid 710 may be divided into a rear driven pulley enclosure part 743 and a front driven pulley enclosure part 744 for the sake of convenience in assembly. In addition, the front driven pulley enclosure part 744 may also be divided into a left portion and a right portion for the sake of convenience in assembly. The hinges 742 are provided on both side surfaces of the rear driven pulley enclosure part 743 and the front driven pulley enclosure part 744, and the hinges 742 of the corresponding both end portions of the two-door type lid 710 are coupled to the both side surfaces of the rear driven pulley enclosure part 743 and the front driven pulley enclosure part 744.

According to the illustrated embodiment, the drive pulley enclosure part 730, the driven pulley enclosure part 740, and the belt enclosure part 750 are described as individual components but are only divided into several pieces on a development view for the sake of convenience in manufacturing a plate and all of the parts form one enclosure. The drive pulley enclosure part 730, the driven pulley enclosure part 740, and the belt enclosure part 750 are named according to detailed functions thereof but are not necessarily meant to be individual components.

In FIG. 2, the fan drive shaft 210 is supported by an upper bearing 220 and a lower bearing 240 and is rotated. The upper bearing 220 is supported by a brace 221, and the lower bearing 220 is supported by a bearing mount.

According to the proposed invention, low noise can be realized by adding a simple structure in an air-cooled heat exchanger within regulations.

In addition, according to the proposed invention, low noise can be realized without incurring a high cost in the air-cooled heat exchanger within the regulations.

In addition, according to the proposed invention, a low noise structure allowing maintenance to be easy can be realized in the air-cooled heat exchanger.

The present invention has been described through the embodiments with reference to the accompanying drawings but is not limited thereto, and it should be interpreted that variously modified embodiments clearly derived by those skilled in the art are included in the present invention. The scope of the present invention includes the variously modified embodiments.

What is claimed is:

1. An air-cooled heat exchanger comprising:
a fan;
a stack in which the fan is installed and which has a height extending from a top of the fan by at least a height of the fan;
a guide housing which is formed to have a dome shape having an area gradually increasing in a downward direction from the stack to guide air discharged to the stack and includes a reinforcement beam laterally attached to an upper surface of the guide housing;
a heat exchange pipe part which is disposed in the guide housing and includes an inlet, an outlet, and a heat exchange pipe extending from the inlet to the outlet in a zigzag manner to cool a cooling target fluid flowing in the heat exchange pipe part using a heat exchange effect; and
a fan drive part including a motor and a power transmission part configured to transmit a rotation force of the motor to the fan to rotate the fan,
wherein the power transmission part includes a drive pulley coupled to a rotation shaft of the motor, a driven pulley coupled to a drive shaft of the fan, and a belt installed between the drive pulley and the driven pulley to transmit the rotation force of the motor; and
an enclosure surrounding the power transmission part and including a lid disposed on a lower surface of the enclosure and openable and closeable downward, wherein the enclosure includes a drive pulley enclosure part of which an outer surface is fixed to the motor and which surrounds the drive pulley, a driven pulley enclosure part which includes a lid coupled to a lower surface of the driven pulley enclosure part and openable and closeable downward and surrounds the driven pulley, and a belt enclosure part surrounding the belt.

2. The air-cooled heat exchanger of claim 1, wherein a sound absorbent formed of aluminum foam is formed on an inner surface of the enclosure.

3. The air-cooled heat exchanger of claim 1, wherein an aluminum foam sound absorbent is formed on an inner surface of at least one of the drive pulley enclosure part, the driven pulley enclosure part, and the belt enclosure part.

* * * * *